United States Patent [19]
Odaohara

[11] Patent Number: 5,969,438
[45] Date of Patent: Oct. 19, 1999

[54] ELECTRONIC APPARATUS HAVING A POWER SUPPLY UNIT THAT CAN SWITCH BETWEEN INTERNAL AND EXTERNAL POWER SOURCES

[75] Inventor: Shigefumi Odaohara, Yamato, Japan

[73] Assignee: International Business Machines Corporation, Armonk, N.Y.

[21] Appl. No.: 09/037,249

[22] Filed: Mar. 9, 1998

[30] Foreign Application Priority Data

Apr. 16, 1997 [JP] Japan ................................. 9-098759

[51] Int. Cl.⁶ ........................................ H02J 1/00
[52] U.S. Cl. ............................. 307/80; 307/64; 307/65; 307/85
[58] Field of Search ................... 307/80, 43, 64, 307/85, 86, 65, 125; 315/160; 333/3, 101, 103; 340/88, 93, 100, 101; 364/528.21, 528.3; 361/79, 86–88; 363/74, 76, 78

[56] References Cited

U.S. PATENT DOCUMENTS

| | | | |
|---|---|---|---|
| 4,879,624 | 11/1989 | Jones et al. | 307/64 |
| 5,138,184 | 8/1992 | Keefe | 307/64 |
| 5,140,511 | 8/1992 | Lee et al. | 363/21 |
| 5,245,220 | 9/1993 | Lee | 307/80 |
| 5,675,245 | 10/1997 | Millar et al. | 324/95 |
| 5,715,156 | 2/1998 | Yilmaz et al. | 307/80 |
| 5,771,161 | 6/1998 | Jackson et al. | 307/64 |
| 5,781,422 | 7/1998 | Lavin et al. | 307/66 |
| 5,811,895 | 9/1998 | Suzuki et al. | 307/125 |
| 5,886,424 | 3/1999 | Kim | 307/64 |

*Primary Examiner*—Fritz Fleming
*Assistant Examiner*—Peter Zura
*Attorney, Agent, or Firm*—Anthony N. Magistrale; Daniel McConnell

[57] ABSTRACT

Disclosed is an electric power supplying unit for use in an electronic apparatus and includes an external AC adapter externally connected to the body of the electronic apparatus for receiving an external AC power source. An internal AC adapter is accommodated into the body of the electronic apparatus for receiving an external AC power source. An AC power source input detection circuit is provided within the internal AC adapter for detecting whether the external AC power source is input to the internal AC adapter. The power supply unit further includes power source switching circuit responsive to the detection output of the AC power source input detection circuit for switching the power supply to the electronic apparatus from the output of the external AC adapter to the output of the internal AC adapter.

8 Claims, 2 Drawing Sheets

ELECTRONIC APPARATUS HAVING A POWER SUPPLY UNIT THAT CAN SWITCH BETWEEN INTERNAL AND EXTERNAL POWER SOURCES

BACKGROUND OF THE INVENTION

1. Field of the Invention

The present invention relates to a power supply unit for use with a portable electronic apparatus and more particularly, a power supply unit and portable electronic apparatus with an AC adapter for converting an AC voltage from an external AC power supply to a DC voltage.

2. Description of Related Art

Currently, there are a variety of personal computers (PC's) available such as desktop, tower and notebook systems. Among them, the notebook PC is designed to be small and light weight in order to provide a portable and transportable use in a mobile environment (i.e., the notebook PC can be used outdoors or at the place it is moved to). A typical example of a notebook PC is an IBM ThinkPad 760 which is sold by IBM Corporation ("ThinkPad" is a trademark of the IBM Corporation).

Almost all notebook PC's are of a battery driven type which can be driven by an internal battery. This is a result of a notebook PC's use in a mobile environment where a commercial electric power source is not available. Conversely, in an office environment where a commercial electric power source is available, an external AC adapter may be attached to a notebook PC to drive the system by a DC input voltage from the AC adapter and charge the internal battery.

It is preferable to use a commercial electric power source which is unlimitedly sustained as a primary power source of a notebook PC rather than an internal battery which has to be cared for its duration or capacity. Consequently, many users that carry a notebook PC also carry an external AC adapter so as to attach it where an AC power source is available. However, while a notebook PC is of a flat shape and a specific form factor (e.g., A4 and B5 sizes) which can be conveniently put into a brief case it is not easy to put an external AC adapter, which is of varying shapes and sizes, into a brief case which is already occupied by the notebook PC. In view of this, a notebook PC of the type which can install an internal AC adapter is recently in advent. An internal AC adapter is an AC adapter which can be contained in the housing of a notebook PC. The internal AC adapter is received in a receptacle space (i.e., media bay) for a detachable storage device such as a CD-ROM drive and a floppy disk drive (FDD).

FIG. 1 schematically shows a powering system of a conventional notebook PC which supports an internal AC adapter.

As shown in FIG. 1, a notebook PC 100 of this type may rely as a primary power source on either a DC output VO of an external AC adapter 10 or a DC output VO' of an internal AC adapter 20. Each output of the AC adapters 10 and 20 is transmitted through output lines 15 and 25 for input in parallel to a DC/DC converter 30. It should be noted that both the external AC adapter 10 and the internal AC adapter 20 are devices for generating a DC output from a commercial electric power source.

The external AC adapter 10 is electrically and detachably connected to the body of the PC 100 by DC inlets 11a and 11b which are provided, for instance, on the wall of the housing of PC 100. The internal AC adapter 20 is exchangeably accommodated, for instance, into the media bay of the PC 100 and is electrically connected to the body of the PC 100 through connectors 21a, 21b. In addition, a power source cable 22 for electrically connecting the internal AC adapter to a commercial power source is detachably plugged in a DC inlet 23 which is exposed on the wall of the housing of PC 100.

The DC/DC converter 30 is a device for converting the DC input to a stabilized DC voltage level which is suitable to drive each hardware element within PC 100 and distribute the output voltage thereof to various portions in PC 100.

The PC 100 is also provided with an internal battery 40 as a primary power source. The battery 40 is usually in the form of a "battery pack" into which a plurality of battery cells are packaged. A re-chargeable battery cell such as Li-ion and NiMH is usually used for the battery cell. The battery 40 is adapted to function as a primary power source of the PC 100 when it is not fed by either one of AC adapters 10 and 20. The AC adapters 10 and 20 are also adapted to charge the battery 40 with their extra electric power. A charge/discharge control circuit 41 controls feeding (charging) the battery 40 as well as feeding (discharging) from the battery 40 to the system.

Incidentally, with an electronic apparatus of the type to which a plurality of AC adapters are attachable, that is, an electronic apparatus having a plurality of AC inputs, a disadvantage exists in that a protecting circuit (e.g., a circuit for protecting from an over voltage or an over current) does not operate properly or the charging current of the battery is excessively large when more than one AC adapter is operated simultaneously. It is therefore necessary to implement in such type of electronic apparatus a mechanism to prevent simultaneous operations of more than one AC adapter or a mechanism for exclusively allowing only one of the AC adapters to supply an output even where a plurality of AC inputs exist.

For example, in FIG. 1, the above disadvantage involved in co-existence of more than one AC adapter can be avoided by providing a switching circuit 50 on the output line 15 of the external AC adapter 10.

The switching circuit 50 is a device for selecting either one of the output VO of the external adapter 10 and the output Vo' of the internal AC adapter 20 and consists of a p-channel MOS FET switch 51 for disconnecting the output line 15 of the external AC adapter 10. The FET switch 51 is serially connected on the output line 15 and has a gate electrode connected to the collector of an npn transistor 53 through a resistor of 20k as an input. The source and the gate electrodes of the FET switch 51 are connected to each other through a resistor of 200k. The npn transistor 53 is provided for connecting/disconnecting the gate electrode of the FET switch 51 to and from ground and has its emitter electrode connected to ground. The emitter and the base electrodes of the transistor 53 are connected to each other through a resistor of 47k. The base electrode of the transistor 53 receives, as an input, the output VO of the external AC adapter 10 (via a resistor of 100k) and the collector electrode of another npn transistor 52 via a resistor of 47k which are ORed together. The transistor 52 is provided for connecting/disconnecting the base electrode of the transistor 53 to and from ground and has its collector electrode connected to the base electrode of the transistor 53 and the emitter connected to ground. The emitter and the base electrodes of the transistor 52 are connected to each other through a resistor of 47k. The base electrode of the transistor 52 receives as an input a detection signal 63 of a detection circuit 60 through a resistor of 47k.

The detection circuit 60 is a device for detecting the DC output VO' of the internal AC adapter 20 and comprises a zener diode 61 connected in parallel to a point P on the output line 25 of the internal AC adapter 20 and a resistor 62 of 20k which connects the other end of the zener diode 61 to ground. The zener diode 61 is an element which has a characteristic in which a reverse current I abruptly increases when a reverse voltage exceeding a zener voltage (Vz: Vz is 5.6 V in FIG. 1) is applied (well known). Therefore, when the output VO' of the internal AC adapter exists, a detection signal 63 is asserted as a result of the reverse current flowing through the zener diode 61. A reverse current blocking diode 70 is inserted in a forward direction in the down stream of the point P on the output line 25 to prevent the detection circuit 60 from being activated by the DC output VO of the external AC adapter 10.

The co-operative operation of the switching circuit 50 and the detection circuit 60 will now be explained hereunder.

It is assumed that the external AC adapter 10 has an AC input while the internal AC adapter 20 has no AC input. In this case, the DC output VO of the external AC adapter is blocked by the diode 70 so that there is no voltage exceeding the zener voltage 5.6 V appearing on the point P on the output line 25. As a result, the output line 63 of the detection circuit 60 is negated and indicates a ground level. The transistor 52 in the switching circuit 50 is switched off due to a low level applied to the base electrode. In response to the transistor 52 being off, the DC output Vo of the external AC adapter in high level is applied to the base electrode of the transistor 53 so that the transistor 53 is switched on. As a result, the FET switch 61 is switched on because its gate electrode is grounded thereby connecting the output line 15 so that the DC output VO of the external AC adapter is supplied to the DC/DC converter 30.

It is next assumed that an AC input is given to the internal AC adapter 20. In this case, the internal AC adapter 20 generates the DC output VO' to apply a voltage exceeding the zener voltage 5.6 V to the point P on the output line 25. As a result, a reverse current I flows through the zener diode 61 to assert the output line 63 of the detection circuit 60. The transistor 52 in the switching circuit 50 is switched on by a high level applied to the base electrode. In response to the transistor 53 being on, the transistor 53 is switched off by ground or low level voltage applied to the base electrode. As a result, FET switch 51 is switched off because the gate electrode is no longer at a low level. With the FET switch 51 being switched off, the output line 15 of the external AC adapter is disconnected and, in place thereof, the DC output VO' of the internal AC adapter 10 is supplied to the DC/DC converter 30.

For example, the IBM ThinkPad 760 series notebook PC (described above) implements a powering system as shown in FIG. 1, which allows an internal AC adapter to be installed. With such a powering system, the AC input is suitably switched depending on the presence or absence of the internal AC adapter so that an erroneous operation of the over voltage/over current protecting circuit of each AC adapter or an excessive powering to the battery is avoided.

It should be noted that a reverse current blocking diode 70 (described above) has to be serially connected to the output line 25 in the feeding system as shown in FIG. 1. It is because, without the diode 70, the output VO of the external AC adapter 10 would flow into the detection circuit 60 so that the detection circuit is unable to exactly detect the presence of the internal AC adapter 20. However, the diode 70 which assumes a significant electric resistance to the current flowing forward is serially connected on the output line 25 for transmitting the main electric power, consuming an electric power of 1.8 W at maximum upon operation of the internal AC adapter 20. Such power consumption is an intolerable waste of electric power and is a heat source within the PC housing. A heat dissipation measure would be required for the heat source, inviting increased consumption of space in the housing as well as an increase in cost.

OBJECTS OF THE INVENTION

It is an object of the present invention to provide an improved electric power supplying unit and a portable electronic device having an internal AC adapter which is provided with an AC adapter for converting an AC voltage input from an external AC power source to a DC voltage.

It is a further object of this invention to provide an improved electric power supplying unit and a portable electronic device having an internal AC adapter of the type to which an external AC adapter is also attachable.

It is another object of this invention to provide an improved electric power supplying unit and a portable electronic device having an internal AC adapter which minimizes heat generation and a circuit area resulting from the use of an internal AC adapter.

SUMMARY OF THE INVENTION

One embodiment of the present invention is directed to an electric power supplying unit for use in an electronic apparatus and includes an external AC adapter externally connected to the body of the electronic apparatus for receiving an external AC power source. An internal AC adapter is accommodated into the body of the electronic apparatus for receiving an external AC power source. An AC power source input detection means is provided within the internal AC adapter for detecting whether the external AC power source is input to the internal AC adapter. The power supply unit further includes power source switching means responsive to the detection output of the AC power source input detection means for switching the power supply to the electronic apparatus from the output of the external AC adapter to the output of gait the internal AC adapter.

Another embodiment of the present invention is directed to a portable electronic apparatus which includes an external AC adapter externally connected to the body of the electronic apparatus for receiving an external AC power source. An internal AC adapter is accommodated into the body of the electronic apparatus for receiving the external AC power source. A DC/DC converter is provided for level converting the DC output of the external AC adapter or the internal AC adapter. The apparatus further includes a system load driven by the DC output of the DC/DC converter. An AC power source input detection means is provided within the internal AC adapter for detecting whether the external AC power source is input to the internal AC adapter. The apparatus also includes power source switching means responsive to the detection output of the AC power source input detection means for switching the power source to the DC/DC converter from the output of the external AC adapter to the output of the internal AC adapter.

A further embodiment of the present invention is directed to an AC adapter of the type which is attached to a portable electronic apparatus and includes a cable connector part for connecting to an external AC power source. The adapter also includes a conversion circuit part for converting the AC voltage received from the AC power source to a DC voltage. An output terminal is provided for outputting a converted DC voltage to the portable electronic apparatus. The adapter includes a detection part for asserting a detection signal in response to reception of the external AC power source. Lastly, a detection terminal is included for outputting the detection signal to the portable electronic apparatus.

DETAILED DESCRIPTION OF THE INVENTION

Figure 1:
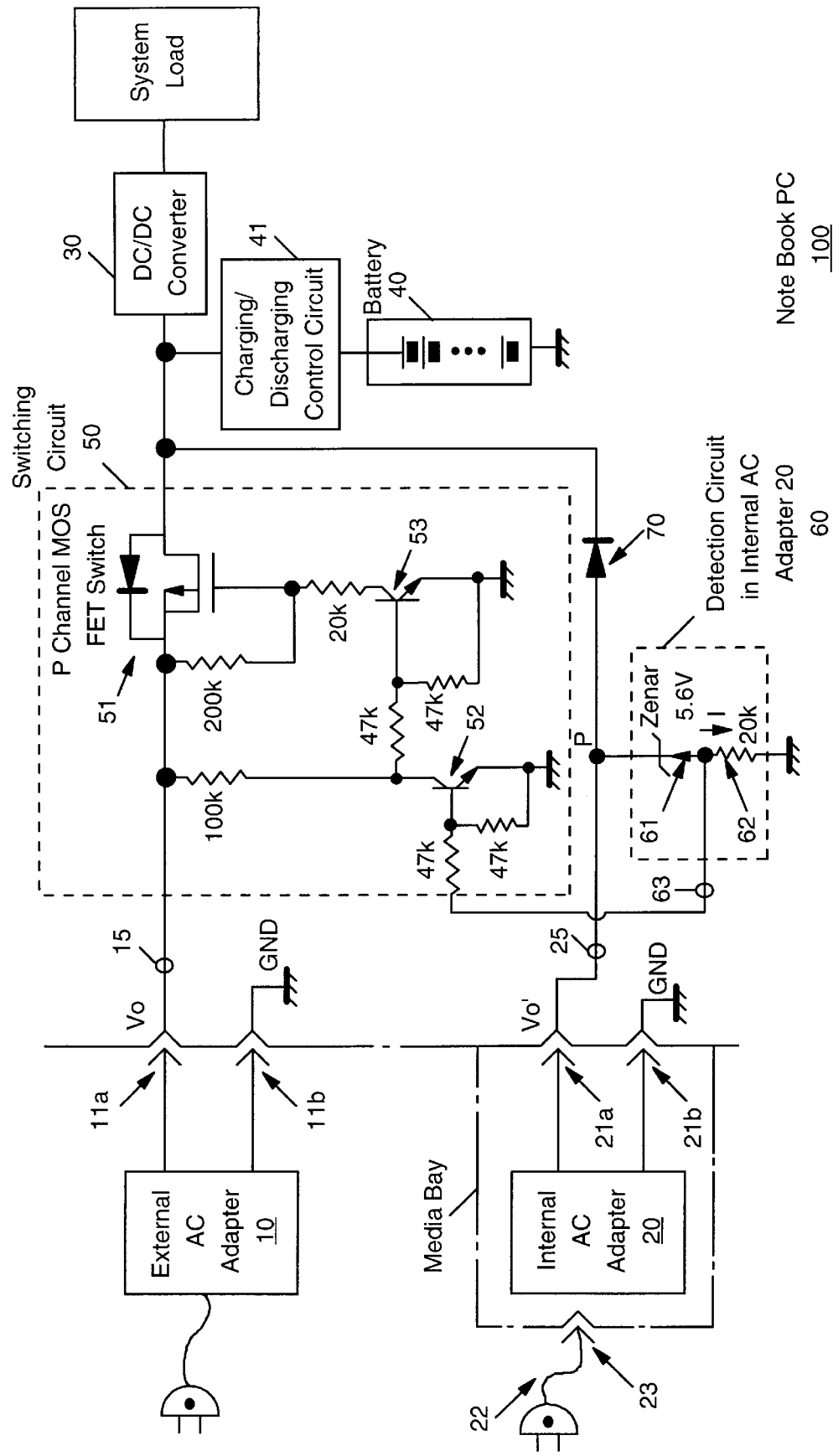
FIG. 1 schematically shows a powering system of a conventional notebook PC which supports an internal AC adapter.
Figure 2:
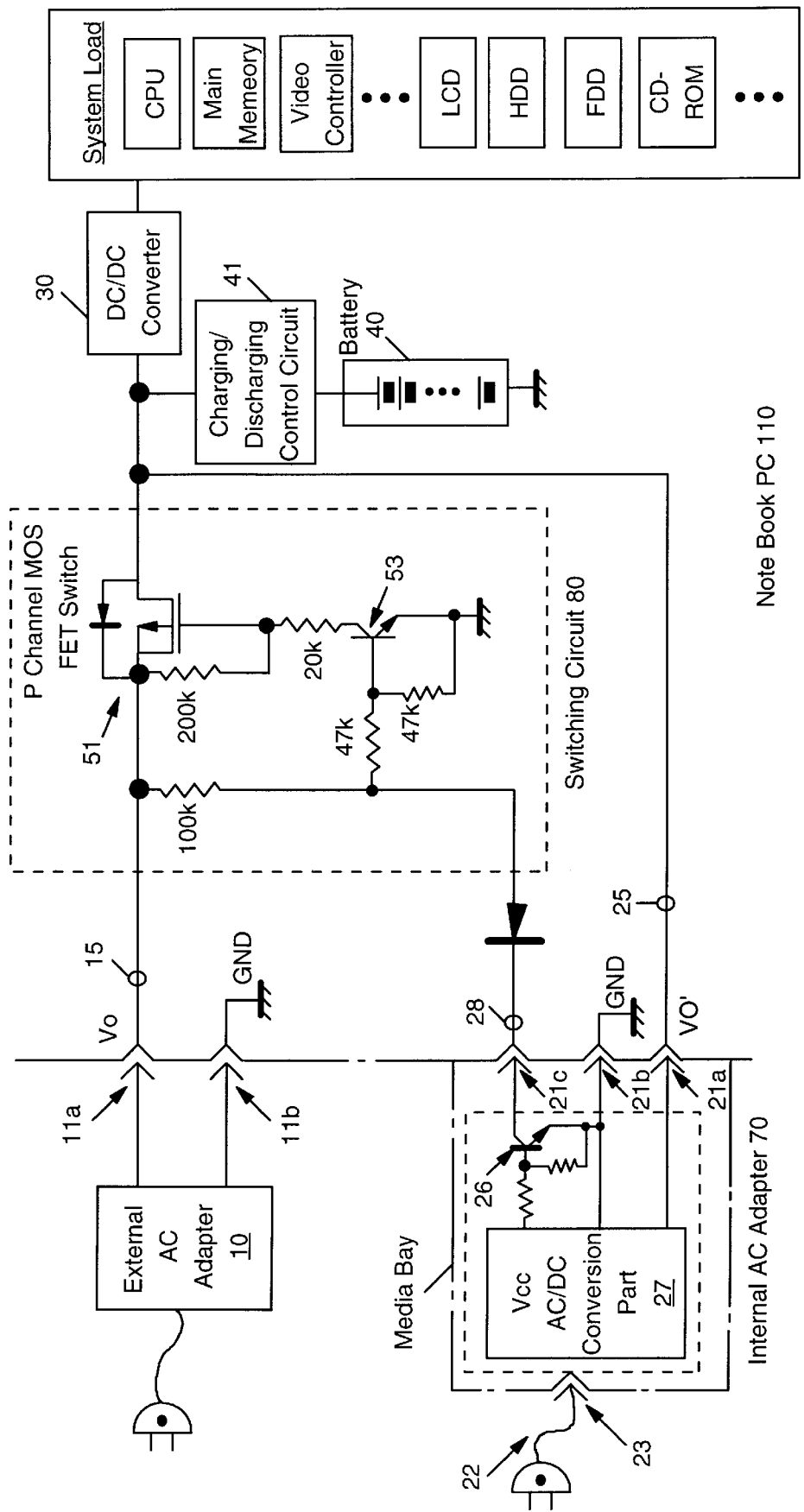
FIG. 2 schematically shows a configuration of a powering system in a notebook PC in accordance with the present invention.

FIG. 2 is a schematic diagram of a powering system of a notebook PC 110 in accordance with the present invention. It is to be noted that the same reference numbers are used as those for the components in FIG. 1 wherever the components correspond to each other.

As shown in FIG. 2, the notebook PC 110 is provided with the DC output VO of the external AC adapter 10 and the DC output VO' of the internal AC adapter 70 as a primary power source. Each DC output of the AC adapters 10 and 70 is transmitted through the output lines 15 and 25, respectively, for parallel input to the DC/DC converter 30.

The external AC adapter 10 is electrically and detachably connected to the body of the PC 110 by means of a DC inlet 11 provided on the wall of the housing of the PC 110, for example. The DC inlet 11 comprises at least a terminal 11a for receiving the DC output VO of the external AC adapter and a terminal 11b for connecting to ground. The external AC adapter 10 is adapted to generate the DC voltage VO from the input AC voltage using, for instance, a PWM controller having separate excitation (well known in the art of the present invention).

The internal AC adapter 70 is received, for example, in a media bay of the housing of the PC 110 exchangeably with other peripheral devices (e.g., CD-ROM drive, floppy disk drive (FDD), second battery, etc.). A connector 21 is provided at a predetermined position in the media bay for electrically connecting the internal AC adapter. The connector 21 comprises at least a terminal 21a for receiving the DC output VO' of the internal AC adapter, a terminal 21b for connecting to ground and a terminal 21c for receiving the detection signal 28. In addition, a power source cable 22 for electrically connecting the internal AC adapter 70 with a commercial AC power source is detachably inserted in AC inlet 23 which is exposed from a wall of the housing of PC 110.

The internal AC adapter 70 comprises (1) an AC/DC converter part 27 for converting the AC voltage to the DC voltage VO' of a predetermined voltage level and (2) a detection part for detecting whether or not the external AC power source is actually input to the AC/DC converter part 27 (i.e., internal AC adapter 70). The ACIDC converter part 27 may be of the type using a separately excited PWM controller (not shown but well known as noted above). On the other hand, the detection part consists of a single npn transistor 26. The base electrode of the transistor 26 receives a power source voltage Vcc generated from the input of the external AC power source. The emitter electrode of transistor 26 is grounded through the terminal 21b, and the collector electrode is input through the terminal 21c, as the detection signal 28, to the switching circuit 80 in the body of the PC 110.

When the external AC power source is input to the internal AC adapter 70, the power source voltage Vcc is generated. The power source voltage Vcc is available by using the power source voltage of the PWM controller, for example. While an input is available from the external AC power source, the transistor 26 is switched on by a high level input to the base electrode. As a result, the detection signal 28 indicates a low level (i.e., asserted) because the terminal 21c is grounded through the terminal 21b and the transistor 26. On the other hand, when the external AC power source is not input to the internal AC adapter 70, the transistor 26 is switched off because the base voltage is not applied. As a result, the terminal 21c becomes open (that is, the detection signal line 28 is negated). Similarly, the terminal 21c becomes open (that is, the detection signal line 28 is negated) when the internal AC adapter 70 is not attached to the body of the PC 110.

The DC/DC converter 30 is a device for stepping down and stabilizing the DC input to a voltage level which is suitable for driving each electrical circuit within the PC 110. The output voltage of the DC/DC converter 30 is distributed to each system load within the PC 110. The system load as referred to here includes a CPU as a main controller and a main memory, as well as various peripheral controller chips including a video controller, a liquid crystal display (LCD) unit (including a back light unit) as a display device, and a hard disk drive (HDD), a CD-ROM drive and FDD as an auxiliary storage device.

The PC 110 is additionally provided with an internal battery 40 as a primary power source. The battery 40 is usually in the form of a "battery pack" into which a plurality of battery cells are packaged. A re-chargeable battery cell such as Li-ion and NiMH is usually used for the battery cell. The battery 40 is adapted to function as a primary power source of the PC 110 when it is not fed by either one of AC adapters 10 and 70. The AC adapters 10 and 70 are also adapted to charge the battery 40 with their extra electric power. A charge/discharge control circuit 41 controls powering (charging) the battery 40 as well as powering (discharging) from the battery 40 to the system. The battery 40 and the charge/discharge control circuit 41 will not be described further because the battery operation is not directly relevant to the scope of the present invention.

In FIG. 2, the hardware blocks surrounded by dotted line 80 is the switching circuit. The switching circuit 80 is a device for exclusively selecting, as a DC input to the DC/DC converter 30, either one of the output VO of the external AC adapter 10 or the output VO' of the internal AC adapter 70. The circuit 80 includes a P channel MOSFET switch 51 for disconnecting the output line 15 of the external AC adapter 10. The FET switch 51 is serially connected on the output line 15 while its gate electrode is connected to the collector electrode of an npn transistor 53 via a resistor of 20k as an input. The source and the gate electrodes of the FET switch 51 are connected each other via a resistor of 200k. The npn transistor 53 is provided for connecting/disconnecting the gate electrode of the FET switch 51 to and from ground and has its emitter electrode connected to ground. The base electrode of the transistor 53 receives as an input the output VO of the external AC adapter 10 (via a resistor of 100k) and the detection signal line 28 (a diode is inserted in a reverse direction) via a diode which is inserted in forward direction and a resistor of 47k which are ORed together. The emitter and the base electrodes of the transistor 53 are connected to each other via a resistor of 47k.

When the terminal 21c is open (i.e., when the detection signal line 28 is negated), the DC output VO of the external AC adapter 10 is applied to the base electrode of the transistor 53. The transistor 53 is switched on as a result of a high level input to the base electrode, so that the gate electrode of the FET switch 51 receives a ground or low level as an input. Consequently, the FET switch 51 is switched on to allow the output line 15 to be connected through so that the output VO of the external AC adapter 10 will be supplied to the DC/DC converter 30.

On the other hand, when the terminal 21c is at the ground level (i.e., when the detection signal line 28 is asserted), the transistor 53 is switched off as a result of the ground or low level applied to the base electrode. Consequently, the FET switch 51 is switched off because the gate electrode is not in a low level so that the output line 15 of the external AC adapter 10 is disconnected and, in place thereof, the output VO' of the internal AC adapter 70 will be supplied to the DC/DC converter 30.

It should be fully understood that there is no need to provide a reverse current blocking diode (that is, a heat source) on the output lines 15 and 25 for transmitting the main electric power in the power source system in FIG. 1.

It is noted that the output terminals of the external AC adapter 10 and the internal AC adapter 70 collide with each other. However, a collision does not occur because a rectifying diode is placed in the secondary winding side of a transformer coil (not shown) in each AC adapter 10, 70.

Now that the electric power system implementing the present invention has been described, the co-operative operation of the detection part in the internal AC adapter 70 and the switching circuit 80 in the body of PC 110 will now be described.

It is assumed first of all that there is an AC input in the external AC adapter 10 while the internal AC adapter 70 (DC inlet 23) has no power source cable 22 attached thereto. This includes a case where the internal AC adapter 70 is not mounted from the beginning in the body of the PC 110 in addition to a case where the internal AC adapter 70 has no power source cable 22 attached thereto. In this case, the transistor 26 is switched off as a result of the base voltage not applied. Consequently, the terminal 21c is in an open state (that is, the detection signal line 28 is negated).

When the terminal 21c is open, the DC output VO of the external AC adapter 10 is applied to the base electrode of the transistor 53. Then the transistor 53 is switched on due to a high level applied to the base electrode, so that the gate electrode of the FET switch 51 is applied with a ground or low level as an input. As a result, FET switch 51 is switched on to connect the output line 15 so that the DC output VO of the external AC adapter 10 is supplied to the DC/DC converter 30.

It is assumed next that an AC input is supplied to the internal AC adapter 70. When the AC input is supplied to the internal AC adapter 70, the power source voltage Vcc is generated. Then, the transistor 26 is switched on because the base electrode is brought to a high level by the power source voltage Vcc. Consequently, the terminal 21c is connected to ground through the terminal 21b and the transistor 26 (i.e., the detection signal line is asserted).

When the terminal 21c is in a grounded state, the transistor 53 is switched off because the ground or low level is applied to the base electrode of the transistor 53. Accordingly, the FET switch 51 is switched off because the gate electrode is no longer in a low level so that the output line 15 of the external AC adapter 10 is disconnected and, in place thereof, the DC output VO' of the internal AC adapter 70 is supplied to the DC/DC converter 30.

It has been described that there is no need to provide a reverse current blocking diode (that is, a heat source) on the output lines 15 and 25 for transmitting the main power in the power supplying system in FIG. 2. Also, in such a power supplying system, switching between the external AC adapter 10 and the internal AC adapter 70 can be effected precisely as described in the above. In other words, the present invention provides a power supply unit and a portable electronic apparatus with an AC adapter installed therein which minimizes heat generation and the area of circuits resulting from provision of the internal AC adapter.

While the invention has been particularly shown and described with respect to preferred embodiments thereof, it should be understood by those skilled in the art that the foregoing and other changes in form and detail may be made therein without departing from the spirit and scope of the invention as defined in the appended claims. For example, this invention may be applied to any type of electric and electronic apparatus in which an internal AC adapter is installable such as facsimile equipment, a mobile wireless terminal, a cordless telephone set, electronic notebook, various cordless equipment including a video camera and a word processor.

What is claimed is:

1. An electric power supplying unit for use in an electronic apparatus comprising:

an external AC adapter externally connected to the body of said electronic apparatus for receiving an external AC power source;

an internal AC adapter accommodated into the body of said electronic apparatus for receiving an external AC power source;

an AC power source input detection means provided within said internal AC adapter for detecting whether the external AC power source is input to said internal AC adapter;

power source switching means responsive to the detection output of said AC power source input detection means for switching the power supply to said electronic apparatus from the output of said external AC adapter to the output of said internal AC adapter; and wherein said output of said internal AC adapter is directly connected to said electronic apparatus.

2. The electric power supplying unit of claim 1, wherein said electronic apparatus includes a DC inlet for detachably connecting said external AC adapter to the exterior of said electronic apparatus.

3. The electric power supplying unit of claim 1, wherein said AC power source input detection means outputs a detection signal generated by a voltage which is in turn generated by the AC power source input to said internal AC adapter and said power source switching means disconnects the output of said external AC adapter from said electronic apparatus in response to the detection signal.

4. The electric power supplying unit of claim 2, wherein said AC power source input detection means outputs a detection signal generated by a voltage which is in turn generated by the AC power source input to said internal AC adapter and said power source switching means disconnects the output of said external AC adapter from said electronic apparatus in response to the detection signal.

5. A portable electronic apparatus comprising:

an external AC adapter externally connected to the body of said electronic apparatus for receiving an external AC power source;

an internal AC adapter accommodated into the body of said electronic apparatus for receiving the external AC power source;

a DC/DC converter for level converting the DC output of said external AC adapter or said internal AC adapter;

a system load driven by the DC output of said DC/DC converter;

an AC power source input detection means provided within said internal AC adapter for detecting whether the external AC power source is input to said internal AC adapter;

power source switching means responsive to the detection output of said AC power source input detection means for switching the power source to said DC/DC converter from the output of said external AC adapter to the output of said internal AC adapter; and wherein said output of said internal AC adapter is directly connected to said DC/DC converter.

6. The portable electronic apparatus of claim 5, wherein said electronic apparatus includes a DC inlet for detachably connecting said external AC adapter to the exterior of said electronic apparatus.

7. The portable electronic apparatus of claim 5, wherein said AC voltage input detection means outputs a detection signal at the ground level by the voltage generated by the AC power source which is input to said internal AC adapter, and said power source switching means disconnects the output of said external AC adapter from said electronic apparatus in response to the detection signal at the ground level.

8. The portable electronic apparatus of claim 6, wherein said AC voltage input detection means outputs a detection signal at the ground level by the voltage generated by the AC power source which is input to said internal AC adapter, and said power source switching means disconnects the output of said external AC adapter from said electronic apparatus in response to the detection signal at the ground level.

* * * * *